(12) United States Patent
Walker et al.

(10) Patent No.: US 8,557,510 B2
(45) Date of Patent: Oct. 15, 2013

(54) COLOUR FORMING COMPOSITION

(75) Inventors: Martin Walker, Cheshire (GB); Anthony Jarvis, Cheshire (GB)

(73) Assignee: Datalase Ltd., Cheshire (GB)

(*) Notice: Subject to any disclaimer, the term of this patent is extended or adjusted under 35 U.S.C. 154(b) by 80 days.

(21) Appl. No.: 13/060,598

(22) PCT Filed: Aug. 26, 2009

(86) PCT No.: PCT/GB2009/051065
§ 371 (c)(1), (2), (4) Date: Feb. 24, 2011

(87) PCT Pub. No.: WO2010/029331
PCT Pub. Date: Mar. 18, 2010

(65) Prior Publication Data
US 2011/0151384 A1  Jun. 23, 2011

(30) Foreign Application Priority Data

Sep. 10, 2008 (GB) .................................. 0816530.0
Apr. 2, 2009 (GB) .................................. 0905785.2

(51) Int. Cl.
*G03C 1/00* (2006.01)

(52) U.S. Cl.
USPC .......................................... 430/338; 430/332

(58) Field of Classification Search
None
See application file for complete search history.

(56) References Cited

U.S. PATENT DOCUMENTS

| | | | | |
|---|---|---|---|---|
| 3,647,467 A | * | 3/1972 | Grubb ........................ | 430/270.1 |
| 3,652,275 A | * | 3/1972 | Baum et al. .................. | 430/269 |
| 3,706,687 A | * | 12/1972 | Rudzki ........................ | 521/118 |
| 4,251,665 A | * | 2/1981 | Calbo .......................... | 548/215 |
| 4,622,286 A | * | 11/1986 | Sheets ......................... | 430/343 |
| 5,187,019 A | * | 2/1993 | Calbo et al. .................. | 428/524 |
| 7,227,158 B1 | * | 6/2007 | Patel et al. .................. | 250/484.5 |
| 2007/0269740 A1 | * | 11/2007 | Blank et al. .................. | 430/270.1 |
| 2008/0305328 A1 | * | 12/2008 | Green et al. .................. | 428/354 |
| 2009/0128615 A1 | * | 5/2009 | Miller ......................... | 347/232 |
| 2009/0191480 A1 | * | 7/2009 | Rogers et al. ............... | 430/283.1 |
| 2011/0017961 A1 | * | 1/2011 | Jarvis ......................... | 252/586 |
| 2011/0109014 A1 | * | 5/2011 | Rogers et al. ................ | 264/319 |
| 2011/0122347 A1 | * | 5/2011 | Jarvis et al. .................. | 349/106 |
| 2011/0148092 A1 | * | 6/2011 | Jarvis et al. .................. | 283/67 |
| 2011/0155815 A1 | * | 6/2011 | Jarvis et al. .................. | 235/494 |

FOREIGN PATENT DOCUMENTS

| | | | |
|---|---|---|---|
| JP | 56-021122 | * | 2/1981 |
| JP | 04-369639 | * | 12/1992 |
| WO | 00/36210 | * | 6/2000 |
| WO | 2006/018640 | * | 2/2006 |
| WO | 2007/063332 | * | 6/2007 |
| WO | 2007/188104 | * | 8/2007 |

OTHER PUBLICATIONS

KAT-NIPS (NaCURE DNNDSA catalysts), King industries, 8 pages (2013).*

* cited by examiner

*Primary Examiner* — Martin Angebranndt

(74) *Attorney, Agent, or Firm* — Saliwanchik, Lloyd & Eisenschenk

(57) ABSTRACT

A composition comprising i) a color forming component which is susceptible to changing color when irradiated; ii) an amine neutralised alkylaromatic sulphonic acid; and iii) a binder. Methods of marking a substrate comprising incorporating within or applying to a substrate the composition of this invention, and substrates coated with the composition, are also provided.

16 Claims, No Drawings

COLOUR FORMING COMPOSITION

CROSS REFERENCE TO A RELATED APPLICATION

This application is a National Stage Application of International Application Number PCT/GB2009/051065, filed Aug. 26, 2009; which claims priority to Great Britain Application No. 0816530.0, filed Sep. 10, 2008; and Great Britain Application No. 0905785.2, filed Apr. 2, 2009; all of which are incorporated herein by reference in their entireties.

FIELD OF THE INVENTION

The present invention relates to a colour forming composition for marking a substrate, and a method for marking a substrate using it.

BACKGROUND OF THE INVENTION

Leuco dyes are colour forming agents that are colourless in one form but can change into a coloured form when exposed to a particular stimulus. Most leuco dyes respond to changes in pH, typically being colourless under alkaline conditions but becoming coloured in an acidic environment. Leuco dyes form the basis of thermal paper technology in which the leuco dye is used in combination with an acid generating species. Upon application of heat the acid generating species yields protons that interact with the leuco dye and convert it into its coloured form. A well known acid generating species is benzyl p-hydroxybenzoate.

However, conventional leuco dye/acid generating species systems have certain disadvantages. They are known by those skilled in the art to give rise to very poor solvent and scratch resistance, and liquid formulations containing these species such as inks are unstable and difficult to use. Thus there is a need for alternative thermal acid generator systems.

SUMMARY OF THE INVENTION

The first aspect of the invention is a composition comprising i) a colour forming component which is susceptible to changing colour when irradiated; ii) an amine neutralised alkylaromatic sulphonic acid; and iii) a binder.

A second aspect of the invention is a method for marking a substrate, comprising incorporating within or applying to said substrate a composition according to the first aspect of the invention, and irradiating the substrate.

It has been unexpectedly discovered that certain amine neutralised alkylaromatic sulphonic acids can be used in conjunction with colour forming components, in particular leuco dyes, in laser marking applications. Preferred amine neutralisation agents are ammonium, anilino, oxazolidine and bicyclic oxazolidine compounds. Surprisingly, these sulphonic acids are able to initiate the colour change of leuco dye/binder compositions when subjected to laser radiation. They furthermore impart improved solvent and scratch resistance properties on said compositions and produce stable liquid ink formulations.

DESCRIPTION OF THE INVENTION

The substrate is any object or surface in or on which the composition of the invention can be incorporated. Suitable substrates include paper, paperboard, flexible plastic film, moulded thermoplastic articles, corrugate board, wood, glass, ceramics and textiles. The composition may be coated onto the surface of the substrate, or alternatively, added to raw materials which are used to manufacture the substrate, such that the composition is incorporated into the substrate. The composition may be added to a base ink formulation.

The colour forming component may be a 'leuco dye.' Suitable leuco dyes are described in "Dyestuffs and Chemicals for Carbonless Copy Paper" presented at Coating Conference (1983, San Francisco, Calif. pp 157-165) by Dyestuffs and Chemicals Division of Ciba-Geigy Corp Greenboro, N.C. Leuco dyes are colourless in neutral or alkaline media, but become coloured when they react with an acidic or electron accepting substance. Suitable examples include compounds such as triphenylmethanephthalide compounds, azaphthalide compounds, isoindolide phthalide compounds, vinylphthalide compounds, spiropyran compounds, rhodamine lactam compounds, lactone and dilactone compounds, benzoyl leuco methylene blue (BLMB), derivatives of bis-(p-di-alkylaminoaryl)methane, xanthenes, indolyls, auramines, chromenoindol compounds, pyrollo-pyrrole compounds, fluorene compounds, and fluoran and bisfluoran compounds, with fluoran compounds being preferred. Particularly preferred commercial leuco dye products include the Pergascript range by Ciba Speciality Chemicals, Basel, Switzerland and those by Yamada Chemical Co. Ltd, Kyoto, Japan. Others include those made by Nisso Chemical Co GmbH a subsidiary of Nippon Soda Co. Ltd. Tokyo, Japan.

Other colour forming compounds suitable for use in the present invention include charge transfer agents such as carbazoles, in particular N-ethyl carbazole. Further examples are to be found in WO06/051309.

Any diacetylene or combination of diacetylene and other substances capable of undergoing a colour change reaction upon exposure to light may be used in the present invention.

Diacetylene compounds are substances which include at least one diacetylene group, i.e. —C≡C—C≡C—. Particularly preferred are diacetylene compounds that exhibit a polychromic colour change reaction. These compounds are initially colourless but on exposure to suitable light, such as a ultra-violet light, undergo a colour change reaction to produce a blue colour. Certain diacetylenes in their blue form can then be exposed to further light such as near-infrared light, which converts the blue form into a magenta, red, yellow and green form.

Specific examples of diacetylene compounds may be used in the present invention are given in the published patent application number WO2006/018640.

Further examples include those represented by the following general structures:

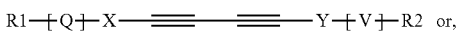

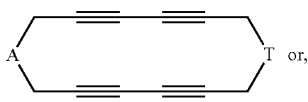

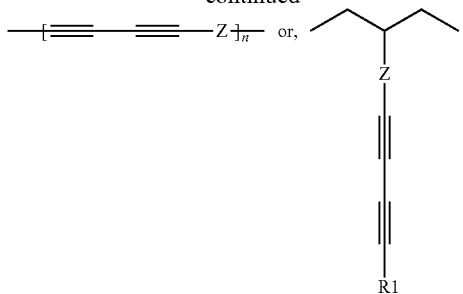

wherein,

X and Y are divalent straight-chain or branched alkylene type groups (—$CH_2$—)$_n$ wherein n=0 to 24, or a divalent phenylene type group (—$C_6H_4$—)$_n$ wherein n=0 to 1 or a combination of both types;

Q and V, if present, are divalent bridging groups such as —S—, —O—, —NHR'— wherein R' is hydrogen or alkyl, amide, ester or thioester groups, carbonyl or carbamate;

R1 and R2 are H or alkyl;

A and T are divalent groups that can either be an alkylene or phenylene type such as X or Y, or a bridging type such as Q or V, or a combination of both types, X or Y that additionally comprises a Q or V group;

Z is a divalent group such as X or Q or a combination of both, X that additionally comprises a Q group, or Z can be not present, and n is 2 to 20,000,000.

Groups X and Y are optionally substituted, preferably at the α, β or γ position with respect to the diacetylene group. For instance, there may be an α-hydroxy group, as shown in the formula below:

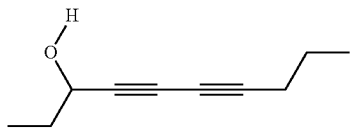

The diacetylene may be symmetrical or non-symmetrical.

Q and V are optionally substituted with groups such as amine, alcohol, thiol or carboxylic acid. Both Q and V may be present, or alternatively, just Q.

Where R1 and R2 in the above compounds are alkyl, they may be straight or branched chain and may additionally comprise other functional groups known in organic chemistry such as alcohol, amine, carboxylic acid, aromatic ring systems and unsaturated groups such as alkenes and alkynes.

Groups R1, R2, Q, V, X and Y may comprise ionic groups, which can be anionic or cationic. Examples include sulphate groups (—$SO_3$—) and ammonium groups. The ionic groups can have any suitable counterion.

Further diacetylene compound examples are diacetylene carboxylic acids and derivatives thereof. A particularly preferred diacetylene carboxylic acid compounds are 10,12-pentacosadiynoic acid and 10,12-docosadiyndioic acid and their derivatives thereof. Further examples include: 5,7-dodecadiyndioic acid, 4,6-dodecadiynoic acid, 5,7-eicosadiynoic acid, 6,8-heneicosadiynoic acid, 8,10-heneicosadiynoic acid, 10,12-heneicosadiynoic acid, 10,12-heptacosadiynoic acid, 12,14-heptacosadiynoic acid, 2,4-heptadecadiynoic acid, 4,6-heptadecadiynoic acid, 5,7-hexadecadiynoic acid, 6,8-nonadecadiynoic acid, 5,7-octadecadiynoic acid, 10,12-octadecadiynoic acid, 12,14-pentacosadiynoic acid, 2,4-pentadecadiynoic acid, 5,7-tetradecadiynoic acid, 10,12-tricosadiynoic acid 2,4-tricosadiynoic acid, and derivatives thereof. Diacetylene alcohols and diol compounds and derivatives thereof are also preferred, examples include: 5,7-dodecadiyn-1,12-diol, 5,7-eicosadiyn-1-ol, 2,4-heptadecadiyn-1-ol, 2,4-hexadiyn-1,6-diol, 3,5-octadiyn-1,8-diol, 4,6-decadiyn-1,10-diol, 2,7-dimethyl-3,5-octadiyn-2,7-diol, 14-hydroxy-10,12-tetradecadiynoic acid. Others include 1,6-diphenoxy-2,4-hexadiyne, 1,4-diphenylbutadiyne, 1,3-heptadiyne, 1,3-hexadiyne and 2,4-hexadiyne.

A combination of different diacetylenes can also be employed. A particularly preferred combination is that of 10,12-pentacosadiynoic acid or 10,12-docosadiyndioiac acid and derivatives thereof and 2,4-hexadiyn-1,6-diol. 10,12-pentacosadiynoic acid can produce blue, red and yellow. 2,4-hexadiyn-1,6-diol can produce a cyan colour. Activating 10,12-pentacosadiynoic acid to yellow and 2,4-hexadiyn-1, 6-diol to cyan simultaneously gives rise to green.

A diacetylene compound that is 'activatable', i.e. has a first solid form that is relatively unreactive to light, but upon 'activation' is transformed into a second form that is relatively reactive to light and is thus capable of undergoing a colour change reaction to create a visible image, has particular utility in the present invention. Without being limited by theory the activation could be a re-crystallisation, crystal form modification, co-crystal combination or a melting/re-solidification process.

Reversibly activatable diacetylenes that can flip between unactivated and activated forms in response to or removal of a stimulus also form part of the present invention.

Particularly preferred diacetylenes are those that after initial melting and re-solidification activation are colourless but become blue on exposure to light, particularly UV light. The most preferred diacetylenes compounds are carboxylic acids and derivatives thereof where:

either R and/or R' comprises a COX group, where X is: —NHY, —OY, —SY, where Y is H or any group comprising at least one carbon atom.

Particularly preferred still are derivatives in which the carboxylic acid group has been functionalised into an amide, ester or thioester. These can be easily made by reacting a diacetylene carboxylic acid with a chlorinating agent such as oxalyl chloride and then reacting the diacetylene acid chloride with a nucleophilic compound such as an amine, alcohol or thiol. A particularly preferred diacetylene carboxylic acid compound is 10,12-docosadiyndioic acid and derivatives thereof such as amides, esters, thioesters and the like. Especially particularly preferred 10,12-docosadiyndioic acid derivatives are amides. A particularly preferred still 10,12-docosadiyndioic acid amide derivative is the propargylamide in which at least one, preferably both carboxylic acid groups have been transformed into the propargylamide, as shown below:

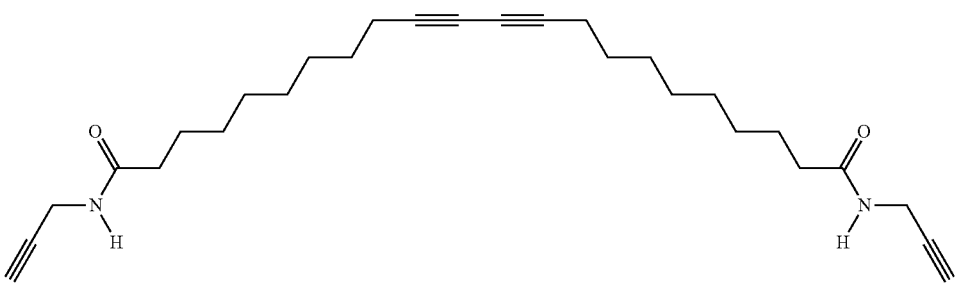 [SMILES: C#CCNC(=O)CCCCCCCCC#CC#CCCCCCCCCC(=O)NCC#C]

Propargylamides are made by reacting carboxylic acids with propargylamine. Other preferred amines that can be used to create suitable amides include: dipropargylamine and 1,1-dimethylpropargylamine.

The activatable diacetylene is generally used together with a NIR light absorbing agent, which is a compound that absorbs light in the wavelength range 700 to 2500 nm.

A NIR light source, such as a NIR fibre laser, is used to heat the composition only in the areas where the image is required. A UV light source, such as a germicidal lamp, is then used to flood the composition with UV light. However, the diacetylene compound only undergoes a colour change reaction to create an image in the areas which were initially exposed to NIR light. The areas of the composition unexposed to NIR light undergo a negligible colour change reaction, remain essentially colourless, and are stable to background radiation. A thermal print head may be used to initiate the heat-based pre-activation step.

Specific examples of NIR light absorbing agents include:
  i. Organic NIR absorbing agents
  ii. NIR absorbing 'conductive' polymers
  iii. Inorganic NIR absorbing agents
  iv. Non-stoichiometric inorganic absorbing agents.

Particularly preferred NIR absorbing agents are those that have essentially no absorbance in the visible region of the spectrum (400 to 700 nm) and thus give rise to coatings that appear visibly colourless.

Organic NIR absorbing agents are known as NIR dyes/pigments. Examples include but are not limited to: families of metallo-porphyrins, metallo-thiolenes and polythiolenes, metallo-phthalocyanines, aza-variants of these, annellated variants of these, pyrylium salts, squaryliums, croconiums, amminiums, diimoniums, cyanines and indolenine cyanines.

Examples of organic compounds that can be used in the present invention are taught in U.S. Pat. No. 6,911,262, and are given in Developments in the Chemistry and Technology of Organic dyes, J Griffiths (ed), Oxford: Blackwell Scientific, 1984, and Infrared Absorbing Dyes, M Matsuoka (ed), New York: Plenum Press, 1990. Further examples of the NIR dyes or pigments of the present invention can be found in the Epolight™ series supplied by Epolin, Newark, N.J., USA; the ADS series supplied by American Dye Source Inc, Quebec, Canada; the SDA and SDB series supplied by HW Sands, Jupiter, Fla., USA; the Lumogen™ series supplied by BASF, Germany, particularly Lumogen™ IR765 and IR788; and the Pro-Jet™ series of dyes supplied by FujiFilm Imaging Colorants, Blackley, Manchester, UK, particularly Pro-Jet™ 830NP, 900NP, 825LDI and 830LDI. Further examples are taught in WO08/050,153.

Examples of NIR absorbing 'conductive' polymers include PEDOT such as, the product Baytron® P supplied by HC Starck. Further examples are taught in WO05/12442.

Examples of inorganic NIR absorbing agents include copper (II) salts. Copper (II) hydroxyl phosphate (CHP) is particularly preferred. Further examples are taught in WO05/068207.

Examples of non-stoichiometric inorganic absorbing agents include reduced indium tin oxide, reduced antimony tin oxide, reduced titanium nitrate and reduced zinc oxide. Further examples are taught in WO05/095516. Reduced indium tin oxide is particularly preferred in combination with a 1550 nm to 2500 nm laser.

It is particularly preferred if the absorption profile of the NIR absorbing agent approximately matches the emission wavelength(s) of the NIR light source employed.

Other light absorbing agents that can be used, instead of the NIR absorbing agent include UV (120 to 400 nm), visible (400 to 700 nm) and mid-infrared (~10.6 microns) light absorbing agents. Examples includes dyes/pigments, UV absorbers and Iriodin type agents.

Charge transfer agents may be used together with a diacetylene in the present invention. These are substances that are initially colourless but react with protons ($H^+$) to produce a coloured form. Charge transfer agents that form part of the present invention include compounds known as carbazoles and suitable examples are described in WO2006/051309. Further charge transfer agents known to those skilled in the art such as leuco dyes can also be used. Charge transfer agents are usually used in combination with other substances such as light absorbing agents which can be wavelength specific, heat generating agents, acid generating agents and the like.

A particularly preferred combination for use in this invention is a diacetylene such as 10,12-pentacosaidiynoic acid, or 10,12-docosadiyndioic acid (or a derivative thereof), to give blue and red, with a charge transfer agent that generates green.

The alkylaromatic sulphonic acids which are used in the present invention can vary widely in chemical nature. They may contain one or more aromatic rings (e.g., benzene or naphthalene rings) and one or more sulphonic acid groups. When the acid has a single aromatic ring, the acid is an alkyl-benzene sulphonic acid and the alkyl groups may be positioned on the aromatic ring in the ortho, meta, or para position. Suitable alkyl-benzene sulphonic acids include p-decyl benzene sulphonic acid, p-dodecyl benzene sulphonic acid, and the like. The preferred alkyl-benzene sulphonic acid is p-toluene sulphonic acid. When the acids contain a naphthalene ring, the substituents may be in any position and mixed positional isomers are also included within the scope of the invention. The naphthalenic acids can have one or more sulphonic acid groups as well as straight or branched alkyl groups. Suitable naphthalenic sulphonic acids include dihexyl naphthalene disulphonic acid, diheptyl naphthalene disulphonic acid, dihexyl naphthalene sulphonic acid, and the like. The preferred naphthalenic sulphonic acids are dinonylnaphthalene disulphonic acid and dinonylnaphthalene (mono)sulphonic acid. Dinonylnaphthalene disulphonic acid is particularly preferred.

Preferably, the alkylaromatic sulphonic acid is a polyalkylaromatic polysulphonic acid.

The preferred alkylaromatic sulphonic acids of the present invention have the following general structure:

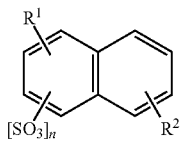

wherein $R^1$ and $R^2$ are each independently, $C_1$ to $C_{24}$ alkyl which may be, branched or linear;

$SO_3$ is a sulphonic acid or sulphonate groups which may be attached to either ring;

n is 1 to 6, preferably 1 or 2, more preferably 2.

Preferably $R^1$ and $R^2$ are each, independently $C_6$ to $C_{18}$ alkyl, more preferably $C_8$ to $C_{12}$ alkyl. $C_9$, nonyl is particularly preferred. Other functional groups known in organic chemistry may be present in the alkyl chains.

Examples of suitable polyalkylaromatic polysulfonic acids that can be used in the present invention are to be found in U.S. Pat. No. 5,187,019 and U.S. Pat. No. 4,251,665, the contents of each of which are incorporated by reference.

The amine used to neutralise the polyalkylaromatic polysulphonic acid typically comprises a nitrogen atom capable of protonation. Preferred examples include ammonium, anilino, oxazolidine and bicyclic oxazolidine salts.

Ammonium compounds useful in this regard have the following general formula:

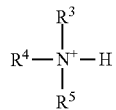

wherein $R^3$, $R^4$ and $R^5$ are each, independently selected from H, $C_1$ to $C_{24}$ alkyl, which may be branched or linear or hydroxyalkyl. Other functional groups known in organic chemistry may be present in the alkyl chains. Preferred examples include triethanolammonium and N,N-dimethylhydroxyethylammonium compounds.

Anilino compounds useful in the present invention have the following general formula:

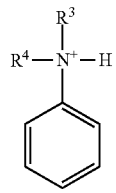

wherein $R^3$ and $R^4$ are each, independently selected from H, $C_1$ to $C_{24}$ alkyl, which may be branched or linear or hydroxyalkyl. Other functional groups known in organic chemistry may be present in the alkyl chains.

Suitable bicyclic oxazolidines have the general formula:

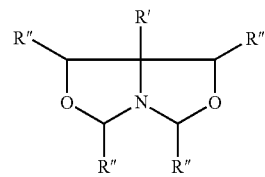

where R' is a straight or branched organic group such as an alkyl group or hydroxy alkyl group, preferably a $C_1$ to $C_6$ alkyl or hydroxyalkyl group and most preferably an ethyl group or hydroxy methyl group, and where R" is hydrogen or a $C_1$ to $C_6$ alkyl group (e.g., a methyl or isopropyl group) and preferably R" is hydrogen. The preferred bicyclic oxazolidine is 1-aza-3,7-dioxa-5-ethylbicyclo (3.3.0) octane.

Suitable oxazolidine compounds include oxa-azacyclopentane compounds and have the general formula

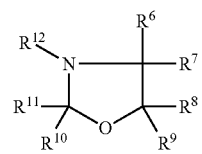

where $R^6$, $R^7$, $R^8$, $R^9$, $R^{10}$, $R^{11}$ an $R^{12}$, independently, are hydrogen, alkyl, halogen, haloalkyl or alkoxy. The preferred oxa-azacyclopentane is 4,4-dimethyl-1-oxa-3-aza-cyclopentane. A review of oxazolidine chemistry is found in the publication Chemical Reviews, E. D. Bergmann, Vol. 53, pp. 309-352 (1953), the disclosure of which is incorporated herein by reference.

The polyalkylaromatic polysulphonic acid and neutralising amine can form adducts at varying molar ratios which will depend on the particular compounds employed and their properties. For example, the molar ratio of polyalkylaromatic polysulphonic acid to bicyclic oxazolidines or oxa-azacyclopentane can range from about 0.5 to about 1.5. The most preferred molar ratio is about 1.0.

It is preferred that the pH of the amine neutralised polyalkylaromatic polysulphonic acid (in water) is greater than or equal to 6.5. Typically, the pH is in the range 6.5 to 8.0.

Amine neutralised polyalkylaromatic polysulphonic acids suitable for use in the present invention may be purchased from King Industries, Inc under the name Nacure™.

The binder can be any polymer or resin that can be used in an ink formulation. It can be aqueous or organic solvent based. Suitable examples include the Texicryl series supplied by Scott-Bader (Northamptonshire, England), the Witco-Bond series supplied by Baxenden Chemicals (Accrington, England), the Pioloform series supplied by Wacker-Chemie (Munich, Germany), the Elvacite series supplied by Lucite International Inc (Southampton, England), the Paranol series supplied by Para-Chem (South Carolina, USA), the nitrocellulose series supplied by Nobel Enterprises (Ayrshire, Scotland), the Joncryl series supplied by BASF and the Glascol series supplied by Ciba. The binder system can be water or solvent soluble or an aqueous or solvent based emulsion.

By "marking", is meant any colour change of the composition. The marking may involve more than one colour change. Shades of colour are also included within the meaning of "colour" in this specification. The marking may include, for instance, the generation of images or text on the substrate.

The energy source that is used to mark the substrate is preferably laser radiation. This can be ultraviolet, visible, near infrared or $CO_2$ (10.6 microns) laser radiation. Preferred is near infrared and $CO_2$ laser radiation. Near infrared radiation is that which falls in the wavelength range 780 to 2500 nm. The near infrared laser can be a diode, fibre or a diode array system.

The skilled person can select a suitable colour forming component, or combination of colour forming components, according to the eventual colours required. The marking laser intensity, wavelength and/or time of exposure can all be varied to ensure that an appropriate colour is produced. WO2006/114594 describes an apparatus which includes a laser diode and galvanometer, and is suitable for aligning the laser beam onto the colour forming composition in the present invention. WO2007/039715 furthermore describes a method of inkless printing. As in these publications, the colour of the colour-forming composition in this invention is selectable according to the fluence level of the irradiation at a desired point.

It is also preferred to include an energy absorbing component. Examples include near infrared absorbing compounds such as those that have an absorbance maximum similar to the wavelength of the near infrared radiation employed and preferably have little or no visible colour. Suitable examples include copper compounds such as copper (II) hydroxyl phosphate (CHP) supplied as Fabulase 322 by Budenheim, non-stoichiometric mixed metal oxide compounds such as reduced indium tin oxide (such as Degussa's AdNano products) or reduced antimony tin oxide, organic polymers such as the conductive polymer product Baytron® P supplied by HC Starck, and near infrared absorbing organic molecules, known to those skilled in the art as NIR dyes/pigments. Types of NIR dyes/pigments than can be used comprise, but are not limited to: families of metallo-porphyrins, metallo-thiolenes and polythiolenes, metallo-phthalocyanines, aza-variants of these, annellated variants of these, pyrylium salts, squaryliums, croconiums, amminiums, diimoniums, cyanines and indolenine cyanines.

Examples of organic compounds that can be used in the present invention are taught in U.S. Pat. No. 6,911,262, and are given in "Developments in the Chemistry and Technology of Organic dyes", J Griffiths (ed), Oxford: Blackwell Scientific, 1984, and "Infrared Absorbing Dyes", M Matsuoka (ed), New York: Plenum Press, 1990. Further examples of the NIR dyes or pigments of the present invention can be found in the Epolight™ series supplied by Epolin, Newark, N.J., USA; the ADS series supplied by American Dye Source Inc, Quebec, Canada; the SDA and SDB series supplied by HW Sands, Jupiter, Fla., USA; the Lumogen™ series supplied by BASF, Germany, particularly Lumogen™ IR765, IR788 and IR1055; and the Pro-Jet™ series of dyes supplied by FujiFilm Imaging Colorants, Blackley, Manchester, UK, particularly Pro-Jet™ 830NP, 900NP, 825LDI and 830LDI and the Filtron™ products supplied by Gentex Corp of Carbondale, Pa.

Other energy absorbing components include UV absorbers, visible dyes and pigments, and agents to absorb 10.6 microns energy such as inorganic particles such as calcium salts such as the phosphate, hydroxyphosphate and carbonate, talc, clays, micas, titanium dioxide, molybdates such as ammonium octamolybdate and the like. Coated inorganic particles include antimony tin oxide coated micas and the Lazerflair and Iriodin products supplied by Merck.

EXAMPLES

Chemicals

Dinonylnaphthalene disulphonic acid 55% in isobutanol was supplied by Sigma-Aldrich.

5-Ethyl-1-aza-3,7-dioxabicyclo[3.3.0]octane solution was supplied by Sigma-Aldrich.

4,4-dim ethyl-1-oxa-3-aza-cyclopentane was supplied by Sigma-Aldrich.

Triethanolamine was supplied by Sigma-Aldrich.

N,N-Dimethylethanolamine was supplied by Sigma-Aldrich.

Joncryl 90—an aqueous styrene-acrylic copolymer emulsion binder was supplied by BASF.

Dispelair CF49—an anti-foaming agent was supplied by Blackburn Chemicals.

Yamada ETAC—black leuco dye was supplied by Yamada Chemical Co. Ltd.

Fabulase 322—copper (II) hydroxyl phosphate near infrared absorber was supplied by Budenheim.

Reduced ITO powder was supplied by XMZL.

Benzyl p-hydroxybenzoate (BHB) traditional thermal acid generator was supplied by Sigma-Aldrich.

Example A

Preparation of
4,4-dimethyl-1-oxa-3-azacyclopentane neutralised dinonylnaphthalene disulphonic acid Dinonylnaphthalene disulphonic acid 55% solution in isobutanol (500 g, 0.5 mol) was added to a suitable reaction vessel equipped with stirrer. To this solution was added with stirring isopropanol (469 g), followed by the slow addition of 4,4-dimethyl-1-oxa-3-azacyclopentane (111.5 g, 1.1 mol). The resulting solution was 25% active as dinonylnaphthalene disulphonic acid. If the solution appeared hazy and if deemed necessary, it was filtered. The pH of the mixture at a 1:1 dilution of the amine neutralised dinonylnaphthalene disulphonic product with water was approximately 7.0-7.5.

Example B

Preparation of
1-aza-3,7-dioxa-5-ethylbicyclo(3.3.0)octane neutralised dinonylnaphthalene disulphonic acid Dinonylnaphthalene disulphonic 55% in isobutanol (50.0 g), total of 20.5 g. of isopropanol (35.0 g) and water (6.2 g) were added to a suitable reaction vessel equipped with a stirrer. The resulting mixture was mixed until it was homogeneous. To this mixture 1-aza-3,7-dioxa-5-ethylbicyclo (3.3.0) octane (13.3 g) was slowly added. After the addition the mixture was stirred for 15 minutes. The solution was approximately 25% active dinonylnaphthalene disulphonic acid. The amount of amine used was sufficient to provide 100% theoretical neutralization of the acid.

Example C

Preparation of Triethanolamine Neutralised Dinonylnaphthalene Disulphonic Acid

Dinonylnaphthalene disulphonic 55% in isobutanol (50.0 g), total of 20.5 g. of isopropanol (35.0 g) and water (6.2 g) were added to a suitable reaction vessel equipped with a stirrer. The resulting mixture was mixed until it was homogeneous. To this mixture triethanolamine (15.18 g) was slowly added. After the addition the mixture was stirred for 15 minutes. The solution was approximately 25% active dinonylnaphthalene disulphonic acid. The amount of amine used was sufficient to provide 100% theoretical neutralization of the acid.

Example D

Preparation of N,N-dimethylethanolamine Neutralised Dinonylnaphthalene Disulphonic Acid Dinonylnaphthalene disulphonic 55% in isobutanol (50.0 g), total of 20.5 g. of isopropanol (35.0 g) and water (6.2 g) were added to a suitable reaction vessel equipped with a stirrer. The resulting mixture was mixed until it was homogeneous. To this mixture N,N-dimethylethanolamine (9.0 g) was slowly added. After the addition the mixture was stirred for 15 minutes. The solution was approximately 25% active dinonylnaphthalene disulphonic acid. The amount of amine used was sufficient to provide 100% theoretical neutralization of the acid.

The following base ink formulation was made up in two stages:

1a. Mill Base
Glascol LS2=84 g
Dispelair CF-49=2 g
Fabulase 322=72 g
Yamada ETAC=36 g
Water=10 g
1b. Mill Base
Glascol LS2=138 g
Dispelair CF-49=2 g
Reduced-ITO=18 g
Yamada ETAC=36 g
Water=10 g The above formulations were milled for 10 minutes using a 50 ml Eiger-Torrance bead mill.

2. Ink Ready for Addition of Amine Neutralized Component

Mill base ink made in part 1a or 1b=57 g
Joncryl 90=11 g
Amine neutralized product (Examples A to D)=32 g The formulation was prepared by Silverson mixing for 5 minutes.

Examples 1a and 1b=Example A neutralized product.
Examples 2a and 2b=Example B neutralized product.
Examples 3a and 3b=Example C neutralized product.
Examples 4a and 4b=Example D neutralized product.

The final ink formulations were adjusted to a flow viscosity of 25 seconds using a Zahn 2 cup.

The final inks were coated onto 50 micron white PET film (supplied by HiFi) using a RK-Proofer Printer fitted with a K-3 bar to give an approximate coat weight of 5 gsm. The draw downs were dried and imaged using:

1. A 30 W Videojet $CO_2$ laser.
2. A 20 W, fibre laser operating with a wavelength of 1070 nm (CHP inks only).
3. A 5 W, fibre laser operating with a wavelength of 1550 nm (r-ITO inks only).

All the lasers were controlled via an IBM compatible pc.

Comparison was made with an equivalent formulation made with the traditional acid generator benzyl p-hydroxybenzoate.

The draw downs were also tested for scratch resistance, solvent resistance and ink formulation storage at 40° C.

Example E

A Solid Derivative

Dinonylnaphthelene disulfonic acid was neutralized with 7-ethyl bicyclooxazolidine, and the resultant product worked up as a solid of melting point 153° C.

The solid product was added to mill bases 1a and 1b as follows:

Mill base ink made in part 1a or 1b=57 g
Joncryl 90=22 g
Water=11 g
Solid product prepared above=10 g The final two inks (examples 5a and 5b) were drawn down onto 50 micron white PET film using a RK-Coater fitting with a K-3 bar. The drawdowns were imaged using the 1070 nm (example 5a CHP ink) and 1550 nm (example 5b r-ITO ink) fibre lasers.

RESULTS

All ten ink formulations made comprising the amine neutralized dinonylnaphthalene disulphonic acid products produced human readable text and machine readable codes.

It was found that the solvent and scratch resistance of the eight ink formulations made comprising the amine neutralized dinonylnaphthalene disulphonic acid products was surprisingly superior to that of the equivalent benzyl p-hydroxybenzoate ink formulation.

It was also found that the 40° C. storage stability of the ink formulations made comprising the amine neutralized dinonylnaphthalene disulphonic acid products was superior to the equivalent benzyl p-hydroxybenzoate ink formulation.

The invention claimed is:

1. A composition comprising:
   i) a colour forming component which is susceptible to changing colour when irradiated;
   ii) an amine neutralized alkylaromatic sulphonic acid; and
   iii) a binder,
   wherein the amine neutralized alkylaromatic sulphonic acid is a polyalkylnaphthalene polysulphonic acid derivative.

2. The composition according to claim 1, wherein the amine neutralized polyalkylnaphthalene polysulphonic acid derivative is a dinonylnaphthalene disulphonic acid derivative.

3. The composition according to claim 1, wherein the amine neutralised alkylaromatic sulphonic acid comprises an ammonium, anilino, oxazolidine or bicyclic oxazolidine salt.

4. The composition according to claim 3, wherein the oxazolidine is 4,4-dimethyl-1-oxa-3-aza-cyclopentane.

5. The composition according to claim 3, wherein the bicyclic oxazolidine is 1-aza-3,7-dioxa-5-ethylbicyclo (3.3.0) octane.

6. The composition according to claim 3, wherein the amine neutralised alkylaromatic sulphonic acid comprises a dimethylhydroxyethylammonium or triethanolammonium salt.

7. The composition according to claim 1 wherein the colour forming component is susceptible to increasing in colour intensity upon exposure to acidic conditions.

8. The composition according to claim 1, wherein the colour forming component is a leuco dye.

9. The composition according to claim 1, wherein the colour forming component is a charge transfer agent.

10. The composition according to claim 1, wherein the composition further comprises an energy absorbing component.

11. The composition according to claim 10, wherein the energy absorbing component is a copper compound, a metal or mixed metal oxide, a conductive polymer, an organic molecule, or an inorganic particle or coated inorganic particle.

12. The composition according to claim 11, wherein, the copper compound is copper (II) hydroxyl phosphate, and the mixed metal oxide is reduced ITO.

13. The composition according to claim 10, wherein the energy absorbing component is capable of absorbing UV, visible, near infrared or mid-infrared energy.

14. A method for marking a substrate, comprising incorporating within or applying to said substrate a composition according to claim 1, and irradiating the substrate.

15. The method according to claim 14, wherein the substrate is irradiated with a UV, visible, near-infrared or CO2 laser.

16. A substrate coated with a composition according to claim 1.

\* \* \* \* \*